U S009916760B1

United States Patent
Balasubramanian et al.

(10) Patent No.: US 9,916,760 B1
(45) Date of Patent: Mar. 13, 2018

(54) EFFICIENT TRAFFIC MAP RENDERING

(71) Applicant: Amazon Technologies, Inc., Seattle, WA (US)

(72) Inventors: Rajkumar Balasubramanian, Tamil Nadu (IN); Jason Allen Doucette, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/199,517

(22) Filed: Jun. 30, 2016

(51) Int. Cl.
*G08G 1/09* (2006.01)
*G01C 21/36* (2006.01)

(52) U.S. Cl.
CPC .......... *G08G 1/092* (2013.01); *G01C 21/367* (2013.01); *G01C 21/3694* (2013.01)

(58) Field of Classification Search
CPC ... G08G 1/092; G01C 21/367; G01C 21/3694
USPC .......................................................... 701/117
See application file for complete search history.

(56) References Cited

U.S. PATENT DOCUMENTS

| 6,975,932 | B2 * | 12/2005 | Obradovich | B60R 16/0231 340/435 |
| 8,395,529 | B2 * | 3/2013 | Seder | G01S 13/723 340/905 |
| 8,711,850 | B2 * | 4/2014 | Kim | G01C 21/36 370/232 |
| 9,349,285 | B1 * | 5/2016 | Fowe | G08G 1/00 |
| 9,665,100 | B2 * | 5/2017 | Shashua | G05D 1/0221 |
| 2005/0143902 | A1 * | 6/2005 | Soulchin | G01C 21/3635 701/117 |
| 2006/0247845 | A1 * | 11/2006 | Cera | G08G 1/09 701/117 |
| 2006/0247846 | A1 * | 11/2006 | Cera | G08G 1/09 701/118 |
| 2006/0247850 | A1 * | 11/2006 | Cera | G01C 21/32 701/532 |
| 2006/0253245 | A1 * | 11/2006 | Cera | G01C 21/32 701/117 |
| 2006/0253246 | A1 * | 11/2006 | Cera | G08G 1/096861 701/117 |
| 2007/0038362 | A1 * | 2/2007 | Gueziec | G01C 21/3492 701/117 |
| 2009/0009323 | A1 * | 1/2009 | Weaver | G01D 21/00 340/539.26 |

(Continued)

*Primary Examiner* — Atul Trivedi
(74) *Attorney, Agent, or Firm* — Lee & Hayes, PLLC

(57) ABSTRACT

By storing an increased number of traffic conditions within existing coding uniforms, the system described herein efficiently transmits traffic conditions with a high degree of granularity and low bandwidth cost. A digital map server determines a traffic condition for a portion of a road, packages the traffic condition within a channel of an individual coding uniform of a coding language, and transmits the coding uniform to a computing device. Alternatively, the traffic condition can be encoded within the channel of the coding uniform by the computing device. The coding uniform can also store a length of the portion of road to which the traffic condition corresponds. The computing device may then access the traffic condition, and then render a visual representation of traffic patterns on a digital map. The traffic conditions may also be packaged as arrays within a picture or texture file.

20 Claims, 6 Drawing Sheets

(56) References Cited

U.S. PATENT DOCUMENTS

| | | | | |
|---|---|---|---|---|
| 2011/0063301 | A1* | 3/2011 | Setlur | G06T 17/05 345/441 |
| 2013/0226442 | A1* | 8/2013 | Lynch | G01C 21/3694 701/119 |
| 2013/0332058 | A1* | 12/2013 | Prestor | G08G 1/0962 701/118 |
| 2015/0163345 | A1* | 6/2015 | Cornaby | G06F 3/04847 345/633 |
| 2015/0170514 | A1* | 6/2015 | Stenneth | G08G 1/0125 701/117 |
| 2015/0285655 | A1* | 10/2015 | Chintakindi | G01C 21/3667 701/117 |
| 2015/0286873 | A1* | 10/2015 | Davis | G06F 3/00 382/103 |
| 2016/0093206 | A1* | 3/2016 | Pfeifle | G08G 1/00 701/117 |
| 2016/0104377 | A1* | 4/2016 | French | H04H 20/55 701/117 |
| 2016/0155325 | A1* | 6/2016 | Fowe | G08G 1/00 701/117 |

* cited by examiner

EFFICIENT TRAFFIC MAP RENDERING

BACKGROUND

Many computing devices display digital maps that assist users in navigation. A digital map can be a digital representation of a portion or region of the world and may include representations of roads, rivers, bridges, buildings, parks, and other physical objects. Individual roads may be described by road data that includes a list of two-dimensional (2D) points (e.g., x and y coordinates, polar coordinates, etc.) or three-dimensional (3D) points (e.g., x, y, z coordinates, where the z coordinate is incorporated to represent height/altitude). A digital map can be broken up into one or more map tiles that each correspond to a region that is presented by the digital map. When a user computing device zooms into a region of the digital map, the one or more tiles presented by the computing device may be divided into a subset of tiles that each correspond to the portion of the region into which the user has zoomed.

Digital maps are often rendered with visual representations of the traffic conditions associated with roadways presented within the digital maps. For example, the GPU of a user computing device may render a portion of road as being a particular color (e.g., green/yellow/red/black) to indicate the traffic condition (e.g., normal/slow/bad/motionless) of the portion of road. In some instances, GPU may render multiple representations of traffic for a single portion of road, with individual representations indicating the traffic conditions of the portion of road in a particular direction, lane, etc. For example, where northbound traffic on a portion of road is slower than a posted speed or average speed, the user computing device may render the northbound side of the corresponding portion of road as a yellow line or a red line. Additionally, if the southbound traffic on a portion of road is normal (e.g., at or near a posted speed or average speed, etc.), the user computing device can render the southbound side of the corresponding portion of road as a green line.

In order to enable computing devices to present current traffic conditions, digital map service providers analyze traffic message channel codes, which are an industry standard for providing current traffic conditions, and transmit the traffic conditions to the computing device. The digital map server can receive traffic information (e.g., traffic message channel (TMC) codes, etc.) that corresponds to one or more roads from one or more sources that gather world traffic data. In some instances, the traffic information may be collected and/or accessed from one or more sources, including GPS data, speed detectors, sensors, etc. The digital map server can then determine traffic conditions for a portion of a road by comparing the traffic information with expected traffic speeds for the portion of the road. For example, for a portion of road that has a speed limit of 60 mph, when the TMC codes indicate that traffic is traveling at 60 mph, the digital map server can then determine that the traffic condition for the portion of road is normal. Alternatively, if the TMC codes report that traffic is moving at 0 mph, the digital map server may determine that the traffic condition for the portion of road is at a standstill.

Additionally, as many computing devices receive the traffic conditions via communications where bandwidth is limited, it is desirable for the current traffic conditions to be transmitted as efficiently as possible. Moreover, as a digital map presented by a computing device may include many different roads, and since each road may be associated with multiple different traffic conditions, it is also desirable for the traffic conditions to be transmitted in a way that allows large quantities of traffic information to be transmitted in as few transmissions as possible.

BRIEF DESCRIPTION OF THE FIGURES

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
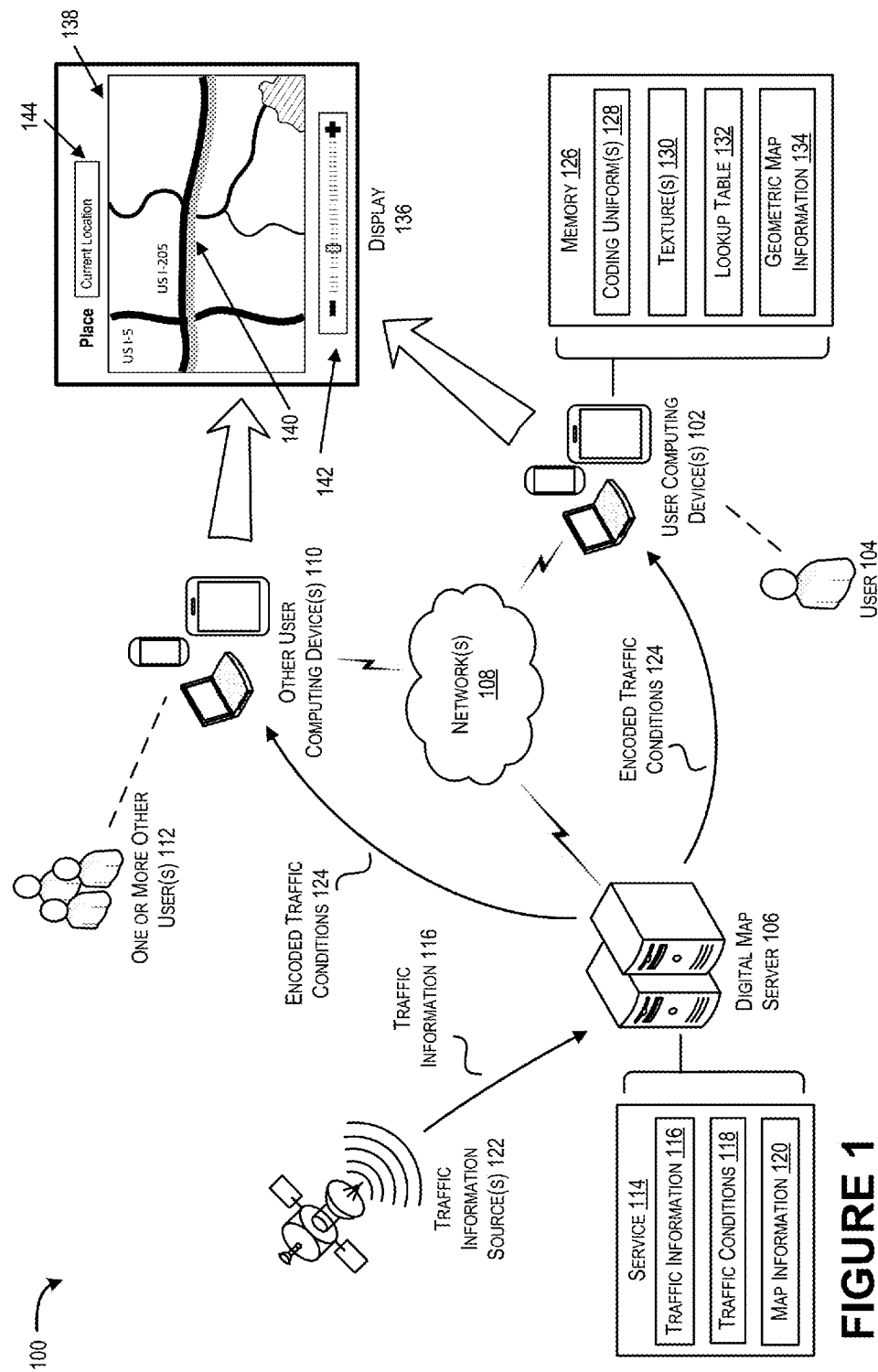
FIG. 1 is a schematic diagram of an example environment for efficiently transmitting current traffic conditions to computing devices, and enabling the computing devices to render digital maps that convey current traffic conditions.

This application describes techniques for efficiently transmitting current traffic conditions to computing devices, and for enabling the computing devices to render digital maps that convey current traffic conditions. Graphics processing units (GPUs) are able to render great quantities of data in a single draw. However, hardware limitations often limit the number of uniforms that can be handled by a GPU in a single draw call. For example, it may only be possible for a GPU to handle 16 uniforms simultaneously. As it is desirable to fully utilize the hardware capabilities of a system, it is desirable to maximize the amount of rendering that can be performed by the GPU in a single draw call. Thus, when rendering traffic representations on a digital map, it is desirable to maximize the number of representations that are rendered per draw call so as to fully harness the capabilities of the GPU.

As traffic conditions are often rendered on digital maps as color coded representations (i.e., green corresponding to normal traffic, yellow corresponding to slow, red corresponding to very slow, black corresponding to stopped, etc.), traffic information can be presented to the GPU in the form of coding uniforms. Coding uniforms are vectors having a set number of channels within which information can be stored. For example, color space uniforms comprise a collection of color index values (e.g., RGB, RGBA, etc.) that are utilized by the GPU to determine the components of the color to be rendered. For example, an RGBA color space can include an R index that corresponds to the red component of the color, a B index that corresponds to the blue component of the color, a G index that corresponds to the green component of the color, and an A index that corresponds to the opacity component of the color. Thus, a GPU that is limited to processing 16 coding uniforms per draw call would only be capable of rendering 16 traffic representations, as each color space uniform only conveys a single color to be rendered.

A first technique to maximize the number of traffic representations that can be rendered within a single draw call is to increase the number of traffic representations that can be included within each coding uniform. This can be achieved by quantizing the traffic conditions (i.e., converting them into an index value, such as a color index) and storing the quantized traffic conditions within individual channels of a coding uniform. That is, once a digital map server has determined a traffic condition for a portion of roadway, the traffic condition may be quantized into an index value (e.g., 0 corresponding to normal, 1 corresponding to slow, 2 corresponding to very slow, 3 corresponding to stopped, etc.) and packaged in a channel of a coding uniform. For example, the traffic condition of "normal" can be quantized as the index value "0," and then stored in the first channel of a coding uniform. In this way, a four channel coding uniform can store up to four quantized traffic conditions (i.e., an individual traffic condition being packaged within each of the four channels).

The GPU of a computing device can then be programmed to access an index value within an individual channel of a coding uniform, and then determine the color that is to be rendered with reference to an accessible color lookup table. For example, the GPU might access an index value of "2" that is stored in the first channel of a coding uniform, and then access a color lookup table to determine that the index value "2" corresponds to the color red. The GPU can then render a red traffic representation on the digital map. Thus, in the above situation where the GPU is limited to processing 16 uniforms per draw call, this first technique would enable that same GPU to render 64 different traffic conditions in a single draw (i.e., 4 traffic conditions for each channel of the coding uniform). A drawback of this technique is that each of the renderings of the 64 traffic conditions are the same length.

A second technique to maximize the number of traffic representations that can be rendered within a single draw call is to increase the number of traffic representations that are included within each uniform while also including parameterization values associated with individual traffic conditions. A parameterization value is a variable that defines a parameter. For example, in addition to storing a quantized traffic condition within a first channel of a coding uniform, a parameterization value corresponding to a length of that traffic condition (e.g., segment of road or other attribute) can also be stored in a second channel of the color space uniform. In this way, a four channel coding uniform can store up to two quantized traffic conditions and two parametrization values.

The GPU of the computing device can then be programmed to access a first index value within a first channel of a coding uniform, determine the color that is to be rendered with reference to an accessible color lookup table, and then access a parameterization value within a second channel. The GPU can then render the traffic representation as being of the determined color and having a length corresponding to the parameterization value. Thus, in the above situation where the GPU is limited to processing 16 uniforms per draw call, this first technique would enable that same GPU to render 32 different traffic conditions in a single draw (i.e., 2 traffic conditions for each channel of the coding uniform), where each rendered traffic condition can be of a varying length.

Alternatively, the parameterization value can be stored in an unused color channel of a color space. For example, if a digital map program does not use the A color channel of color space uniforms, the parameterization value can be stored in the A color channel without interfering with the color determinations made by the GPU during rendering. That is, the GPU would determine the color to be rendered based upon the R, G, and B color components of the color space, but then can also be programmed to access the previously unused A color channel to obtain the parameterization value. The GPU can then render the traffic representation as being of the determined color and having a length corresponding to the parameterization value.

A third technique to maximize the number of traffic representations that can be rendered within a single draw call is to store quantized traffic conditions as individual arrays within a picture file or texture file. Then, instead of including individual coding uniforms in a single draw, a picture or texture file containing quantized traffic conditions can be batched into a single draw.

The GPU can then access geometric information specifying a geometric location in which a particular traffic representation is to be drawn, a length of the traffic representation, the location of the array within the texture file in which the corresponding quantized traffic condition is stored, etc. The GPU can then access the corresponding quantized traffic condition within the texture file, and then determine the color that is to be rendered with reference to an accessible color lookup table. The GPU can then render the traffic representation at the geometric location, being of the determined color, and having a length corresponding to the parameterization value.

This third technique can greatly improve efficiency since, because the size of a picture or texture file is limited by a maximum number of arrays per dimension and/or a maximum number of bytes, a picture or texture file can hold far greater quantities of traffic conditions compared to color space uniforms. Accordingly, the third technique enables the GPU to render a far greater number of traffic representations in a single draw. For example, when a maximum number of arrays per dimension is 2048, a one dimensional texture array can hold 2048 different quantized traffic conditions (i.e., one traffic condition per array), a two dimensional texture array can hold over 4 million quantized traffic conditions, and a three dimensional texture array can hold over 8.5 billion traffic conditions. Alternatively, even where a texture or picture file is limited to a maximum byte size of 16384, because each quantized traffic condition can be stored within a byte, the array would still be able to store 16384 different traffic conditions.

In some instances, the digital map server can transmit updated picture or texture files to the user computing device that contain quantized traffic conditions which reflect current traffic conditions. Alternatively, or in addition, because many traffic conditions will remain constant between transmissions from the digital map server, the digital map server can send updates for traffic conditions that have changed. The user computing device can then cause the quantized traffic conditions stored within a previously transmitted texture file to be updated to reflect current traffic conditions. During rendering, the GPU of the user computing device can then access the updated texture file to draw updated traffic conditions on a digital map.

FIG. 1 is a schematic diagram of an example environment 100 for efficiently transmitting traffic information that enables computing devices to render digital maps that convey current traffic conditions. Additional details of individual features illustrated in FIG. 1 are described in more detail with reference to subsequent figures.

The environment 100 includes a user computing device 102 associated with a user 104. The user computing device 102 may be implemented as any type of computing device including, but not limited to, a personal computer, a laptop computer, a tablet computer, a navigation device, an automobile computing system, a portable digital assistant (PDA), a mobile phone (e.g., a smart phone), an electronic book (e-book) reader, a game console, a set-top box (STB), a smart television (TV), a portable game player, a portable media player, a smart device having a touchscreen interface, and so forth. The user computing device 102 may be in communication with a digital map server 106 via a network 108 such as, for example, a mobile data network, the Internet. or a local wireless network. The environment 100 further includes one or more other user computing devices 110 (i.e., laptops, tablets, smartphones, a navigation device, an automobile computing system, gaming consoles, etc.) associated with the one or more other users 112. The digital map server 106 may be implemented or hosted by one or more servers, server farms, data centers, or other computing devices.

FIG. 1 illustrates the digital map server 106 hosting a service 114. The service 114 can include traffic information 116, traffic conditions 118, and map information 120, as further described herein. Traffic information 116 can be a collection of data that relates to one or more roads including weather, construction zones, road maintenance, road congestion, traffic message channel (TMC) codes, traffic speeds, accidents, road hazards, etc. In some instances, the digital map server 106 may receive traffic information from one or more traffic information source(s) 122 such as GPS satellites, speed detectors, sensors, road cameras, websites, navigation applications, etc. The traffic conditions 118 can be a collection of data relating to the status of traffic (e.g., normal, slow, very slow, motionless, etc.) associated with the one or more roadways. The traffic conditions 118 may further relate to the status of traffic associated with individual portions of the one or more roadways. For example, a traffic condition 118 may indicate that the status of traffic along a 2 mile portion of a roadway is "slow" (i.e., traffic is travelling at a slower than posted or average speed). In some instances, the traffic conditions 118 can include multiple traffic conditions for a single portion of a roadway (e.g., traffic conditions for individual directions of traffic, traffic conditions of individual lanes of a roadway, etc.).

The traffic conditions can be determined by the digital map server 106 based upon the traffic information 116 using one or more rules, algorithms, averages, smart heuristics, etc. For example, for a portion of road which the traffic information 116 indicates is under construction, the digital map server may determine that the status of the traffic associated with the portion of road is "slow." due to a reduced "construction zone" speed limit. Map information 120 can include data associated with roads, highways, bridges, tunnels, and/or other physical objects traveled on or through by vehicles and/or people. For example, map information 120 can include data that describes one or more roads and/or portions of roads as a collection of 2D or 3D data. In the illustrated example, the digital map server 106 is implemented by one or more server(s).

FIG. 1 further illustrates an example process that may be used to efficiently transmit traffic information to enable computing devices to render digital maps that convey current traffic conditions. This process may be initiated by the digital map server 106 receiving traffic information 116 from one or more traffic information sources 122. In some instances, the one or more traffic information sources can include global positioning system (GPS) satellites, speed detectors, sensors, road cameras, websites, navigation applications, etc. For example, a traffic information source 122 may transmit traffic information 116 to the digital map server 106 that indicates that cars on a first portion of a road are traveling at 55 mph, and that cars on a second portion of the road are traveling at 20 mph. The digital map server 106 can then determine the traffic conditions 118 for the first portion of the road and the second portion of the road. For example, if the two portions of road both have a speed limit of 50 mph, the digital map server 106 may determine that the first portion of road is traveling at normal speeds (i.e., has a traffic condition of "normal") and the second portion of road is traveling slower than expected (i.e., has a traffic condition of "slow").

In some instances, the digital map server 106 may then quantize the traffic conditions. For example, the digital map server 106 may assign a value (e.g., a color or speed index) to a portion of road that corresponds with a corresponding traffic condition. The digital map server 106 can package and transmit the quantized traffic conditions 118 as encoded traffic conditions. In some instances, the encoded traffic conditions may include the quantized traffic conditions 118 packaged within one or more uniforms of a coding language (e.g., C++, OpenGL, Direct3D, Java, etc.). For example, the digital map server 106 can package a quantized traffic condition 118 within a channel of a coding uniform (e.g., RGBA color space uniform, etc.). For instance, the digital map server 106 may quantize a traffic condition into an index value (e.g., 0 corresponding to normal, 1, corresponding to slow, 2 corresponding to very slow, 3 corresponding to stopped, etc.) and store the quantized traffic condition in an individual color channel of a color space uniform. For example, a traffic condition of "stopped" can be quantized as the index value "3," and then stored in the R color channel of an RGBA color space. In this way, up to four separate traffic conditions 118 are able to be stored in a single four channel coding uniform (i.e., one traffic condition in each of the four channels).

In some instances, the digital map server 106 can also store a parametrization value that corresponds to the length of a portion of road to which a quantized traffic condition 118 corresponds. That is, the digital map server 106 can package and transmit the parametrization value corresponding to the length of a portion of road within the encoded traffic conditions. In some instances, the digital map server 106 can store the parametrization value as an individual index value within a channel of a coding uniform. For example, the digital map server 106 can store a first quantized traffic condition 118 corresponding to a first portion of road in an R color channel of an RGBA color space, and then store a first parametrization value corresponding to the length of the first portion of road in the G color channel of the color space. In this way, the digital map server 106 can store both a traffic condition and a length of roadway associated with the traffic condition using only two channels of a single coding uniform. In some instances, the digital map server 106 can also store a second quantized traffic condition 118 corresponding to a second portion of road in a B color channel of a color space, and then store a second parametrization value corresponding to the second portion of road in the A color channel of the color space.

In some instances, the digital map server 106 may include one or more coding uniforms having one or more quantized traffic conditions 118 and/or parametrization values stored within them as array values of a picture or texture file. In this way, one or more of the color spaces stored within a texture or picture file can contain one or more traffic conditions 118 and/or parametrization values within its color channels. Alternatively, the packaging module 208 may store quantized traffic conditions 118 as array values of a picture or texture file. In this way, as a single picture or texture file can contain many arrays, the digital map server 106 can package a number of traffic conditions and/or parametrization values within a single picture or texture file.

FIG. 1 further illustrates the digital map server 106 transmitting the encoded traffic conditions 124 to the user computing device 102 and/or the other user computing devices 110. FIG. 1 illustrates the user computing device 102 including a memory 126 that can include coding uniforms 128, textures 130, lookup table 132, and geometric map information 134, as further described herein. The coding uniforms 128 may include one or more coding uniforms that have been transmitted to the user computing device 102 by the digital map server 106, wherein one or more of traffic conditions 118 and parametrization values are stored within the channels of the coding uniforms 128. In some instances, the traffic conditions 118 and/or parametrization values may have been loaded into the coding uniforms 128 by the user computing device 102 during the process of unpacking the encoded traffic conditions 124. The textures 130 may include one or more textures that have been transmitted to the user computing device 102 by the digital map server 106. Textures 130 may have quantized traffic conditions stored as individual arrays of the texture. In some instances, the traffic conditions 118 and/or parametrization values may have been loaded into the textures 130 by the user computing device 102 during the process of unpacking the encoded traffic conditions 124. Alternatively or in addition, texture 130 can have color spaces stored as individual arrays of the texture, wherein individual color channels of the color spaces may include one or more of quantized traffic conditions 118 and parametrization values. The lookup table 132 can be an index table that identifies a color that corresponds to a quantized traffic condition. Lookup table 132 may be transmitted with the encoded traffic conditions 124, hardcoded into the user computing device, included within an application stored on the memory, etc. The geometric map information 134 can include data that includes the geometries of the roads, rivers, bridges, buildings, parks, and/or other physical objects associated with the map.

The user computing device 102 can render a digital map 138 on a display 136 of the user computing device 102. The user computing device 102 can render the digital map 138 based at least partly upon the geometric map information 134. For example, user computing device 102 can access traffic conditions 118 stored within the color channels of one or more coding uniforms 128, utilize lookup table 132 to identify a color that corresponds to the traffic conditions 118, access one or more corresponding parametrization values, and draw a particular length of color 140 in association with the portion of road. In some instances, computing device 102 can draw the particular length of color based upon the geometric map information.

Alternatively, computing device 102 can access geometric map information 134 to determine a geometric location in which a particular traffic representation is to be drawn, a length of the traffic representation, the location of the array within the texture file in which the corresponding quantized traffic condition is stored, etc. Computing device 102 can then access a corresponding quantized traffic condition stored within the texture 130, and then determine the color that is to be rendered with reference to an accessible color lookup table 132. Computing device 102 can then draw a particular length of color 140 in association with the portion of road, the length of color 140 begin drawn at the geometric location, being of the determined color, and having a length corresponding to the parameterization value. In some instances, the display 136 can include selectable options to zoom in or out of the map 142, select the area covered by the map 144, etc.

In some instances, digital map server 106 can transmit updated textures 130 to the user computing device 102. The updated textures 130 can contain quantized traffic conditions 118 which reflect current traffic conditions. Alternatively, or in addition, because many traffic conditions will remain constant between transmissions from digital map server 106, digital map server 106 can send updates for traffic conditions that have changed. User computing device 102 can then cause the quantized traffic conditions stored within texture 130 to be updated to reflect current traffic conditions. During rendering, the user computing device 120 can then access the updated texture file to draw updated traffic conditions on a digital map.

Figure 2:
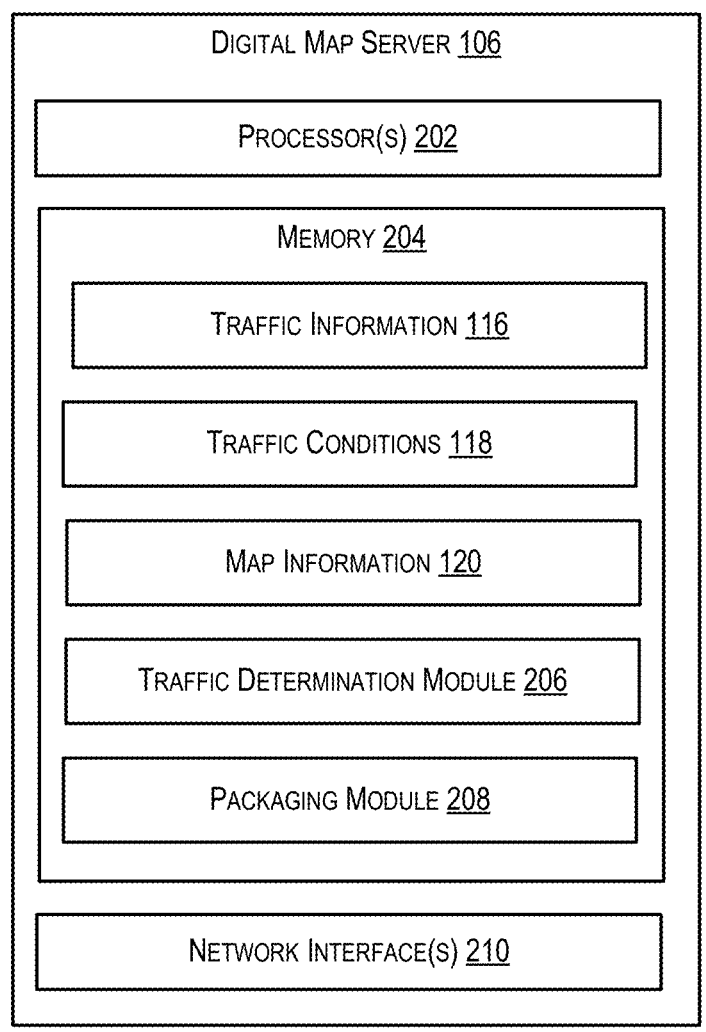
FIG. 2 is a block diagram illustrating components of a digital map server configured to execute techniques for efficiently transmitting traffic information to computing devices.

FIG. 2 is a schematic diagram 200 illustrating components of an example digital map server 106 configured to efficiently transmit traffic information to computing devices. For instance, FIG. 2 illustrates additional details of hardware and software components that can be used to implement the techniques described above with respect to FIG. 1. Additionally, individual hardware and software components illustrated in FIG. 2 can exist in a user computing device 102, another user computing device 110, and/or one or more traffic information sources 122.

In the example of FIG. 2, the digital map server 106 includes one or more processors 202 and memory 204 communicatively coupled to the processor(s) 202. The digital map server 106 can include a traffic determination module 206 and a packaging module 208 stored in the memory 204. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with the digital map server 106 can be executed across multiple devices.

In various examples, memory 204 can further store a database (e.g., service 114) that maintains traffic information 116, traffic conditions 118, and/or map information 120. Traffic information 116 can be a collection of data that relates to one or more roads including weather, construction zones, road maintenance, road congestion, traffic message channel (TMC) codes, traffic speeds, accidents, road hazards, etc. In some instances, the digital map server 106 may receive traffic information from one or more traffic information source(s) 122 such as GPS satellites, speed detectors, sensors, road cameras, websites, navigation applications, etc. The traffic conditions 118 can be a collection of data relating to the status of traffic (e.g., normal, slow, very slow, motionless, etc.) associated with the one or more roadways. The traffic conditions 118 may further relate to the status of traffic associated with individual portions of the one or more roadways. In some instances, the traffic conditions 118 can include multiple traffic conditions for a single portion of a roadway (e.g., traffic conditions for individual directions of traffic, traffic conditions of individual lanes of a roadway, etc.). The traffic conditions can be determined by the digital map server 106 based upon the traffic information 116 using one or more rules, algorithms, averages, smart heuristics, etc. such as those discussed herein. Map information 120 can include data associated with roads, rivers, bridges, buildings, parks, etc. For example, map information 120 can include data that describes one or more roads and/or portions of roads as a collection of 2D or 3D data.

The traffic determination module 206 can be executable by the one or more processors 202 to analyze the traffic information 116 and to determine traffic conditions 118 for one or more roadways. For example, where TMC codes indicate that traffic is moving at 45 mph on a first portion of road and 2 mph at a second portion of road and where other traffic information 116 indicates that the expected speed for both portions of road is 40 mph, the traffic determination module 206 can determine that the traffic condition of the first portion of road is "normal," and the traffic condition of the second portion of road is "motionless." Where traffic information 116 indicates conflicting traffic speeds for a portion of road, the traffic determination module 206 can utilize one or more rules, algorithms, averages, smart heuristics, etc. to determine a corresponding traffic condition for the portion of road. For example, the traffic determination module 206 may determine the traffic condition by averaging the speed values for the portion of road. Alternatively or in addition, the traffic determination module 206 may convert each of the speeds to an amount of time required for a vehicle traveling at that speed to traverse the portion of road, determine an average amount of time, and then convert the average amount of time into an average speed for the portion of road. The traffic determination module 206 can then associate the portion of road with a traffic condition 118 based upon the portion of road's average speed. In some instances, the traffic determination module 206 quantizes the traffic conditions 118. For example, the traffic determination module 206 may assign a value (e.g., a color, speed index, etc.) to a portion of road that is associated with a particular traffic condition. For example, the traffic determination module 206 may compare the average speed for the portion of road to an expected speed for that portion of road (e.g., with reference to speed limits, school zoning, construction work, etc.), and assign a traffic condition 118 for the portion of road (e.g., normal, slow, very slow, motionless, etc.).

The packaging module 208 can be executable by the one or more processors 202 to efficiently package the traffic conditions 118 for transmission to the user computing device 102 and/or other user computing devices 110. For example, the packaging module 208 may package one or more quantized traffic conditions 118 into encoded traffic conditions. In some instances, the encoded traffic conditions may include the quantized traffic conditions 118 packaged within uniforms of a coding language such as C++, OpenGL, Direct3D, Java, etc. For example, the packaging module 208 can quantize a traffic condition of "very slow" into an index value of "3," and then package the quantized traffic condition 118 within a channel of coding uniforms (e.g., RGB or RGBA color space uniforms, etc.). In this way, the packaging module 208 can store up to 4 separate quantized traffic conditions 118 in an RGBA color space uniform (i.e., with a separate traffic condition being packaged within each of the R, G, B, and A channels). In this way, even if a GPU of user computing device 102 can only concurrently process 16 separate color space uniforms per draw, the packaging of the individual traffic conditions 118 within color channels enables the GPU to render 64 separate traffic conditions 118 within a single draw (i.e., four separate traffic conditions for each of the 16 coding uniforms).

The packaging module 208 can also package and transmit parametrization values within the encoded traffic conditions. For example, the packaging module 208 can store the parametrization value as an individual index value within a channel of a coding uniform. In some instances, a parametrization value may correspond to a length of the portions of road to which one or more quantized traffic condition 118 corresponds. For example, the packaging module 208 may store a first quantized traffic condition 118 corresponding to a first portion of road in an R color channel of an RGBA color space, and a first parametrization value corresponding to the length of the first portion of road in the G color channel of the color space. In this way, the packaging module 208 can store both the traffic condition and the length of roadway associated with the traffic condition using only two color spaces of a single color uniform.

In some instances, the packaging module 208 can also store a second quantized traffic condition 118 corresponding to a second portion of road in a B color channel of a color space, and then store a second parametrization value corresponding to the second portion of road in the A color channel of the color space. By packaging traffic conditions 118 and parametrization values within the color channels of a uniform color space in this way, the packaging modules 208 is able to transmit two traffic conditions 118 and the length of road to which each of the conditions correspond within a single uniform. Thus, even if the user computing device 102 can only concurrently process 16 separate color space uniforms per draw, the packaging of the individual traffic conditions 118 and parametrization values within color channels can enable the user computing device 102 to process 32 separate traffic conditions 118 that correspond to differently sized portions of roads within a single draw (i.e., two separate traffic conditions and two parametrization values for each of the 16 color space uniforms).

The packaging module 208 can cause the digital map server 106 to transmit encoded traffic conditions having one or more traffic conditions 118 and/or parametrization values stored within them to the user computing device 102 or other user computing devices 110 via a network 108. In some instances, the packaging module 208 can include one or more color spaces having one or more traffic conditions 118 and/or parametrization values stored within them as array values of a picture or texture file. In this way, one or more of the color spaces stored within a texture or picture file can contain one or more traffic conditions 118 and/or parametrization values within its color channels. Alternatively, the packaging module 208 may store quantized traffic conditions 118 as array values of a picture or texture file. In this way, the digital map server 106 can transmit a number of traffic conditions by transmitting a single texture or picture file.

Additionally, the digital map server 106 may include a network interface 210. The network interface 210 includes physical and/or logical interfaces for connecting the respective computing device(s) to another computing device or a network. For example, the network interface 210 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
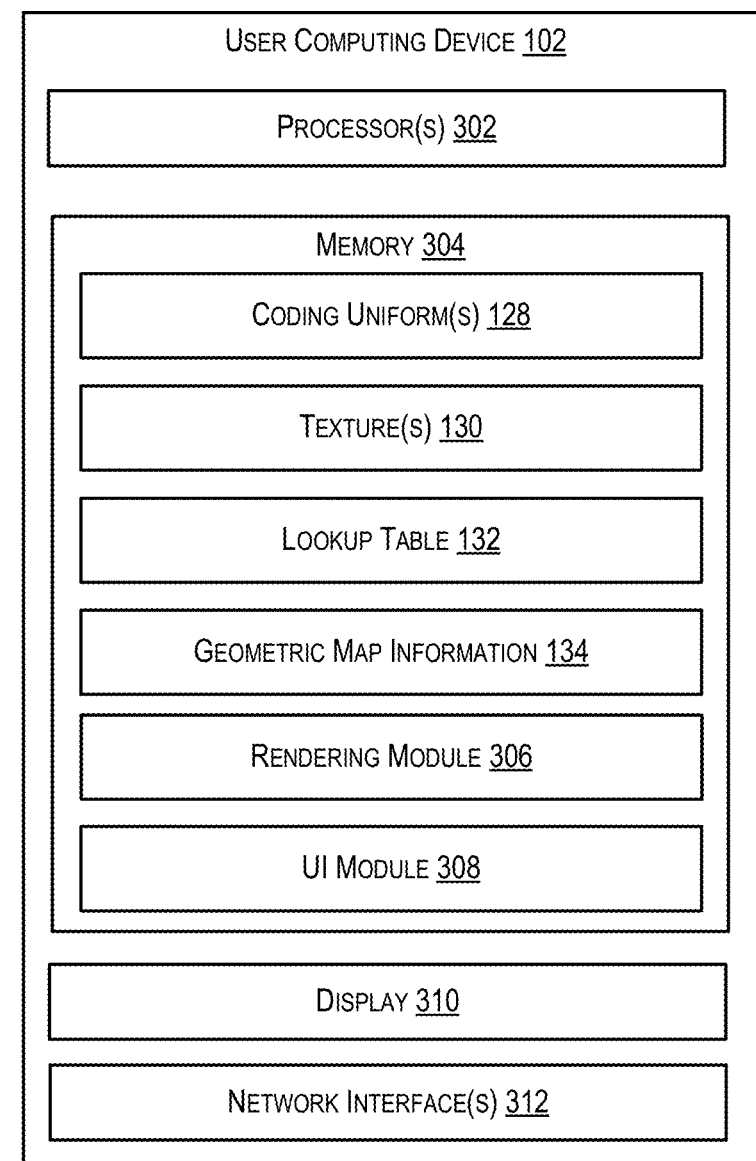
FIG. 3 is a block diagram illustrating components of a user computing device configured to execute techniques for receiving efficiently transmitted traffic information and rendering a digital map that conveys current traffic conditions.

FIG. 3 is a schematic diagram 300 illustrating components of an example user computing device 102 configured to receive efficiently transmitted traffic information and render a digital map that conveys current traffic conditions. For instance, FIG. 3 illustrates additional details of hardware and software components that can be used to implement the techniques described above with respect to FIG. 1. Additionally, individual hardware and software components illustrated in FIG. 3 can exist in one or more of the user computing device 102, the other user computing devices 110, and/or the digital map server 106.

In the example of FIG. 3, the user computing device 102 includes one or more processors 302 and memory 304 communicatively coupled to the processor(s) 302. The user computing device 102 can include rendering module 306 and a user interface (UI) module 308 stored in the memory 304. In various implementations, the modules described herein in association with the user computing device 102 can be executed across multiple devices.

In various examples, memory 304 can further store a database that maintains coding uniforms 128, textures 130, lookup table(s) 132, and/or geometric map information 134. Coding uniforms 128 may include one or more coding uniforms that have been transmitted to the user computing device 102 by the digital map server 106. The coding uniforms 128 may include one or more coding uniforms that have traffic conditions 118 and/or parametrization values stored within their respective channels. In some instances, traffic conditions 118 and/or parametrization values may have been loaded into the coding uniforms 128 by the user computing device 102 during the process of unpacking encoded traffic conditions received from the digital map server. Textures 130 may include one or more texture or picture files that have been transmitted to the user computing device 102 by the digital map server 106. In some instances, one or more color space uniforms stored within a texture or picture file may include one or more of traffic conditions 118 and parametrization values stored within their respective color spaces. In some instances, the traffic conditions 118 and/or parametrization values may have been loaded into the textures 130 by the user computing device 102 during the process of unpacking the encoded traffic conditions 124. Lookup table 132 can be an index table that identifies colors that correspond to various quantized traffic conditions (e.g., a quantized traffic condition of 0 or "normal" corresponds to green). Lookup table 132 may be transmitted with the encoded traffic conditions 124, hardcoded into the user computing device, included within an application stored on the memory, etc. Geometric map information 134 can include data that includes the geometries of the roads, rivers, bridges, buildings, parks, etc. associated with the map. Geometric map information 134 may be utilized by the one or more processors 302 to render a digital map on the display 310 of the user computing device 102.

The rendering module 306 can be executable by the one or more processors 302 to render a digital map including current traffic conditions for display on the display 310 of the user computing device 102. In some instances, the rendering module 306 may utilize one or more programs running on the user computing device 102 (e.g., a vertex shader program, a pixel shader program, etc.) when rendering the digital map. When rendering the digital map, the rendering module 306 may access the geometric map information 134 to identify the geometries of the area to be shown on the digital map. For example, the rendering module 306 may access geometric map information 134 that corresponds to the geometric values of one or more portions of road, rivers, bridges, buildings, parks, etc. In some instances, the geometries of the area to be shown on the map can be described by a list of 2D points (e.g., x and y coordinates, polar coordinates, etc.) or 3D points (e.g., 2D points in which a z coordinate is incorporated to represent height/altitude).

Additionally, when rendering the digital map, the rendering module 306 may render representations of current traffic conditions associated with one or more portions of roads included in the digital map. In some instances, the rendering module 306 may draw colored representations of traffic conditions within the map. For example, the rendering module 306 may render a portion of road as a green, yellow, red, black, etc. to indicate that the traffic condition of a corresponding portion of road is normal, slow, very slow, motionless, etc.

To render such representations, the rendering module 306 may access geometric map information 134 associated with a portion of road associated with the representation to be rendered. For example, the rendering module 306 may access vertex information that may identify where the representation is to be drawn, the length of the representation to be drawn (i.e., a parametrization value), the location of the traffic conditions 118, parametrization values as stored within the channels of coding uniforms 128, etc. The rendering module 306 can use the vertex information (e.g., a vertex buffer object, etc.) to access the traffic conditions 118 and/or parametrization values associated with the representation to be rendered. Once the rendering module 306 accesses a traffic condition stored in the coding uniform, the rendering module 306 can access the lookup table 132 to determine the color of the representation that is to be drawn on the digital map. For example, where the quantized traffic condition stored in the coding uniform is representative of the traffic condition "slow," the lookup table may indicate that the corresponding color is yellow. The rendering module 306 can then utilize the vertex information and the color to render a traffic representation on the digital map.

In some instances, the rendering module 306 can render multiple traffic representations concurrently. For example, the rendering module 306 may render multiple different traffic representations along a length of roadway. Where there are parametrization values stored in association with individual traffic conditions (i.e., a parametrization value for each traffic condition), the rendering module 306 can render each traffic representation as having the length indicated by the corresponding parametrization value.

Where there are no parametrization values stored in association with individual traffic conditions stored in the coding uniforms, the rendering module 306 may render each traffic representation as being of the same length. For example, the rendering module may access a parametrization value to determine a length that all the representations are to have, and render each individual representation as having the length, with each representation beginning where the previous traffic representation terminated. Alternatively, the rendering module 306 may determine the combined length of all the traffic representations to be rendered, and then render each traffic representation as an equal portion of the combined length.

In some instance, the rendering module 306 can use quantized traffic conditions stored as index values in the arrays of a texture or picture file to render traffic representations. Alternatively or in addition, the rendering module 306 can use traffic conditions stored within the color spaces of a texture or picture file to render traffic representations. For example, when rendering a traffic representation on the digital map, the rendering module 306 may access vertex information that identifies the locations in which a quantized traffic condition that is relevant to the traffic representation is stored within the texture or picture file. The rendering module 306 may then utilize the lookup table 132 to determine a corresponding color for the traffic representation. The rendering module 306 can then utilize vertex information and the color to render the traffic representation on the digital map. In some instances, the rendering module 306 may render multiple traffic representations on the map concurrently. In such instances, the vertex information may identify a location of each relevant traffic condition 118 as it is stored within the texture or picture file. Alternatively, the vertex information may identify a location of a first relevant traffic condition 118 as it is stored within the texture or picture file, and remaining relevant traffic conditions may be the next traffic conditions as stored within the texture or picture file. For example, if the rendering module 306 is rendering 16 traffic representations, the vertex information may identify that the traffic condition relevant to a first traffic representation is stored at a first location within a texture file, and the rendering module will then access the traffic conditions 118 stored within the next 15 slots (i.e., color channels within color spaces or indexes stored in the next 15 arrays) of the texture file as being relevant to the other 15 traffic representations.

The UI module 308 can be executable by the one or more processors 302 to generate user interfaces (UIs) for display on the display 310 of the user computing device 102. In some instances, UIs generated by the UI module 308 can include a digital map rendered by the rendering module 306. The UIs generated by the UI module 308 can also include selectable options to zoom in or out of the map 142, select the area covered by the map 144, etc.

Additionally, the user computing device 102 may include a network interface 312. The network interface 312 includes physical and/or logical interfaces for connecting the respective computing device(s) to another computing device or a network. For example, the network interface 312 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

In some implementations, the processing unit(s) 202 and 302 can comprise a central processing unit (CPU), a graphics processing unit (GPU), or both a CPU and a GPU, or any other sort of processing unit. Additionally, memories 204 and 304 can comprise storage devices (removable and/or non-removable) such as, for example, magnetic disks, optical disks, or tape. Memories 204 and 304 can also comprise non-transitory computer-readable media.

Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, RAM, ROM. EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the processing unit(s) 202 and 302.

Figure 4:
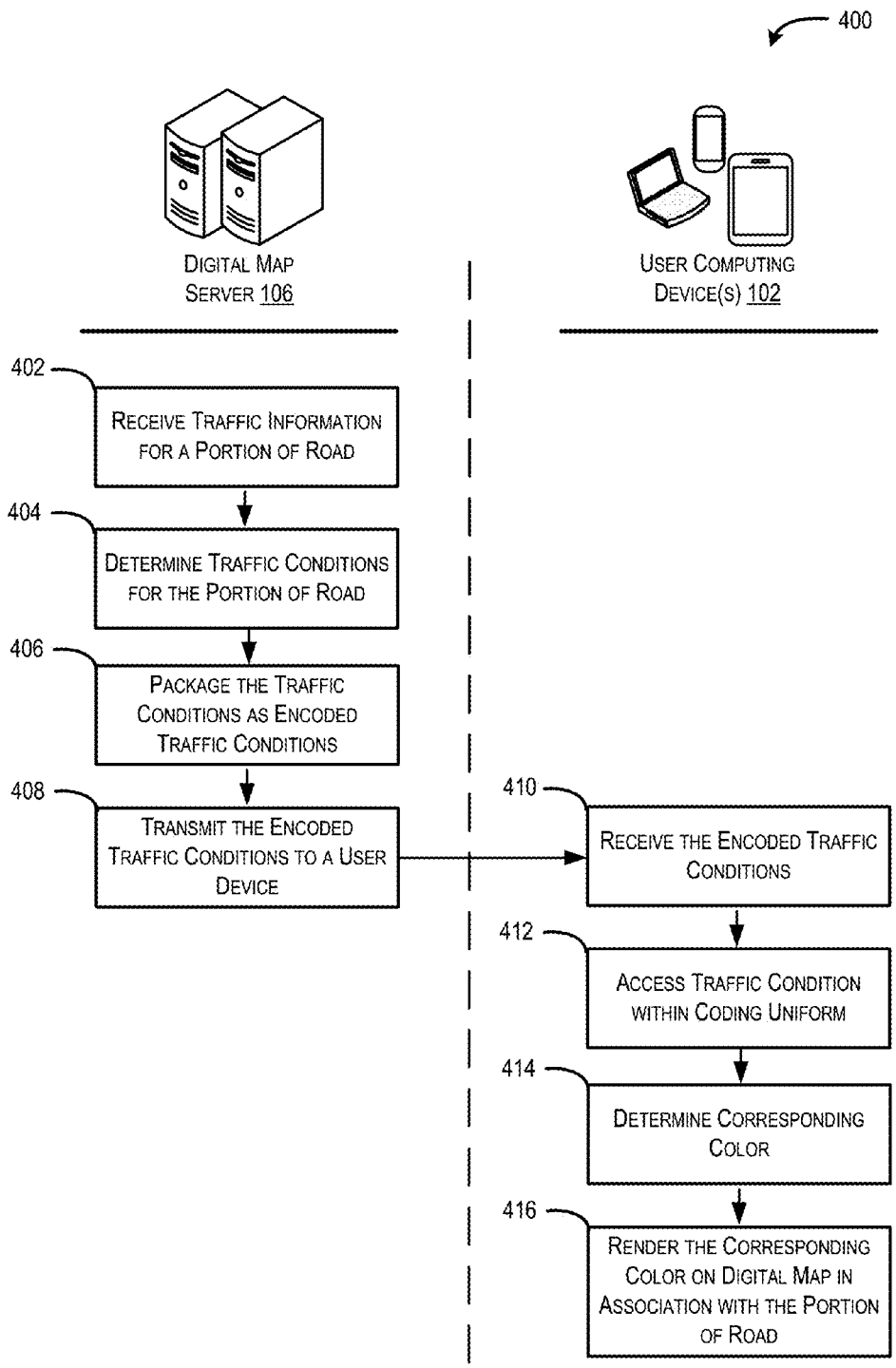
FIG. 4 is a flowchart illustrating an example process for efficiently transmitting traffic information that enables computing devices to render digital maps that convey current traffic conditions.

FIG. 4 illustrates a flowchart of an example process 400 for efficiently transmitting traffic information that enables computing devices to render digital maps that convey current traffic conditions. One or more operations of process 400 may be performed by a digital map server 106, as a local process by a computing device (e.g., user computing device 102), as a local process by an additional computing device (e.g., user computing device 110), or by a combination thereof. For ease of illustration, the operations of the process 400 will be described as being performed by digital map server 106 and user computing device 102.

As shown in FIG. 4, at operation 402, traffic information for a portion of road is received. For example, the digital map server 106 can receive traffic information for the portion of road from one or more traffic information sources such as GPS satellites, speed detectors, sensors, road cameras, websites, navigation applications, etc. The traffic information can include data that relates to weather conditions, construction zones, road maintenance, road congestion, traffic message channel (TMC) codes, traffic speeds, accidents, road hazards, etc. For example, a traffic information source may transmit traffic information to the digital map server 106 that indicates the speeds and/or direction that cars on the portion of road are traveling.

At operation 404, traffic conditions for a portion of road are determined. In some examples, the traffic conditions for the portion of road are determined by the digital map server 106 based in part on the traffic information for the portion of road. In some instances, the digital map server 106 can utilize one or more rules, algorithms, averages, smart heuristics, etc. to determine the traffic condition for the portion of road. For example, where TMC codes indicate that a first car and a second car are traveling at 26 mph and 20 mph on the portion of road, respectively, and where other traffic information indicates that the expected speed for the portion of road is 35 mph, the digital map server 106 can determine that the average speed of cars the portion of road is 23 mph and thus the traffic condition of the portion of road is "slow." The digital map server 106 can then associate the portion of road with a traffic condition of "slow."

At operation 406, the traffic conditions for the portion of road are packaged as encoded traffic conditions. In some examples, the digital map server 106 may quantize the traffic condition (i.e., assign a value, a color, speed index, etc. for the portion of road), and package the quantized traffic condition as encoded traffic conditions. In some instances, the encoded traffic conditions may include the quantized traffic condition packaged within a uniform of a coding language such as C++, OpenGL, Direct3D, Java, etc. In some instances, the digital map server 106 can package the quantized traffic condition within a channel of a coding uniform (e.g., RGB or RGBA color space uniform, etc.). For example, the digital map server may quantize the traffic condition "slow" determined in operation 404 as the value "1," and store the value "1" within the R color channel of an RGBA color space uniform.

At operation 408, the encoded traffic conditions having the traffic condition stored therein are transmitted to a user computing device. In some examples, the digital map server 106 may transmit the encoded traffic conditions to user computing device 102 over network 108. The encoded traffic conditions may also have additional traffic conditions associated with other portions of roads stored within it. For example, where the encoded traffic conditions include a coding uniform, other traffic conditions associated with other portions of road may be packaged within one or more channels of the coding uniform.

At operation 410, the encoded traffic conditions are received by the user computing device. In some examples, the encoded traffic conditions having the traffic condition stored therein are received by user computing device 102, and the traffic condition is stored in a channel of a coding uniform by the user computing device 102 during the process of unpacking the encoded traffic conditions.

At operation 412, the traffic condition within the coding uniform is accessed. In some instances, the user computing device 102 may utilize vertex information associated with the portion of road (e.g., a vertex buffer object) to identify the location of the quantized traffic condition within the coding uniform. For example, the vertex information may identify the coding uniform and/or the channel within the coding uniform in which the quantized traffic information is stored.

At operation 414, a corresponding color for the traffic condition is determined. In some instances, the user computing device 102 can determine the corresponding color for the quantized traffic condition based upon a lookup table. The lookup table can be an index table that identifies colors that correspond to various quantized traffic conditions (e.g., a quantized traffic condition of 0 or "normal" corresponds to green). The lookup table may be transmitted with the color space in operation 408, hardcoded into the user computing device, included within an application stored on the memory, etc. For example, the user computing device 102 can access the lookup table to determine the color of the representation that is to be drawn on the digital map. For example, where the quantized traffic condition stored in the color space is the value "1," the lookup table may indicate that the corresponding color is yellow.

At operation 416, the corresponding color is rendered on the digital map in association with the portion of road. In some instances, the user computing device 102 may access geometric map information associated with the portion of road. For example, the user computing device 102 may access vertex information that identifies a location within a digital map at which the representation is to be drawn, the length of the representation to be drawn (i.e., a parametrization value), etc. The user computing device 102 can then utilize the vertex information and the corresponding color to render a traffic representation on the digital map. For example, the user computing device 102 can render a traffic representation having the corresponding color, the length indicated by an associated parametrization value, at a location on the digital map indicated by the vertex information.

Figure 5:
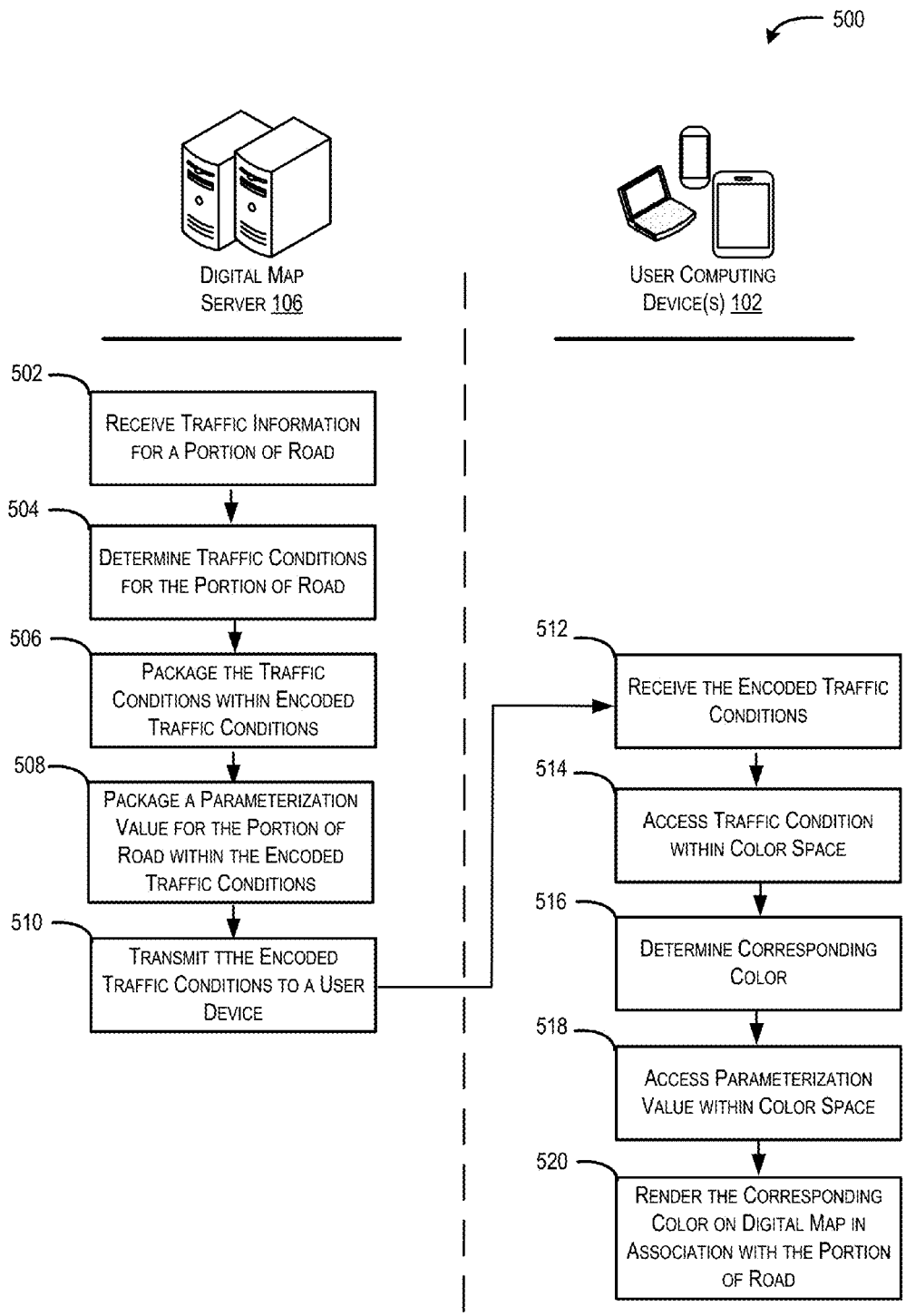
FIG. 5 is a flowchart illustrating an example process for efficiently transmitting traffic information and parametrization values to enable computing devices to render digital maps that convey current traffic conditions.

FIG. 5 illustrates a flowchart of another example process 500 for efficiently transmitting traffic information and parametrization values to enable computing devices to render digital maps that convey current traffic conditions. One or more operations of process 500 may be performed by digital map server 106, as a local process by a computing device (e.g., user computing device 102), as a local process by an additional computing device, or by a combination thereof. For ease of illustration, the operations of the process 500 will be described as being performed by digital map server 106 and user computing device 102.

As shown in FIG. 5, at operation 502, traffic information for a portion of road is received. For example, the digital map server 106 can receive traffic information for the portion of road from one or more traffic information sources such as GPS satellites, speed detectors, sensors, road cameras, websites, navigation applications, etc. The traffic information can include data that relates to weather conditions, construction zones, road maintenance, road congestion, traffic message channel (TMC) codes, traffic speeds, accidents, road hazards, etc. For example, a traffic information source may transmit traffic information to the digital map server 106 that indicates the speeds and/or direction that cars on the portion of road are traveling.

At operation 504, traffic conditions for a portion of road are determined. In some examples, the traffic conditions for the portion of road are determined by the digital map server 106 based in part on the traffic information for the portion of road. In some instances, the digital map server 106 can utilize one or more rules, algorithms, averages, smart heuristics, etc. to determine the traffic condition for the portion of road. For example, where TMC codes indicate that a first car and a second car are traveling at 26 mph and 20 mph on the portion of road, respectively, and where other traffic information indicates that the expected speed for the portion of road is 35 mph, the digital map server 106 can determine that the average speed of cars the portion of road is 23 mph and thus the traffic condition of the portion of road is "slow." The digital map server 106 can then associate the portion of road with a traffic condition of "slow."

At operation 506, the traffic conditions for the portion of road are packaged within encoded traffic conditions. In some examples, the digital map server 106 may quantize the traffic condition (i.e., assign a value, a color, speed index, etc. for the portion of road), and package the quantized traffic condition as encoded traffic conditions. In some instances, the encoded traffic conditions may include the quantized traffic condition packaged within a uniform of a coding language such as C++. OpenGL, Direct3D, Java, etc. In some instances, the digital map server 106 can package the quantized traffic condition within a color channel of color space uniforms (e.g., RGB, RGBA, etc.). For example, the digital map server may quantize the traffic condition "slow" determined in operation 404 as the value "1," and store the value "1" within the R color channel of an RGBA color space uniform.

At operation 508, a parameterization value for the portion of road is packaged within the encoded traffic conditions. In some examples, the digital map server 106 may package the parameterization value as encoded traffic conditions. In some instances, the encoded traffic conditions may include the parameterization value for the portion of road packaged within a color channel of color space uniforms (e.g., RGB, RGBA, etc.). For example, the digital map server may store the parameterization value for the portion of road within the G color channel of an RGBA color space uniform.

At operation 510, the encoded traffic conditions having the traffic condition and the parameterization value stored therein are transmitted to a user computing device. In some examples, the digital map server 106 may transmit the encoded traffic conditions to user computing device 102 over network 108. The encoded traffic conditions may also have additional traffic conditions and/or parameterization values associated with other portions of roads stored within it. For example, where the encoded traffic conditions include a RGBA color space uniform, a second traffic condition associated with a second portion of road may be packaged within the B color channel of the color space, and a second parametrization value associated with the second portion of road may be stored within the A color channel of the color space.

At operation 512, the encoded traffic conditions are received by the user computing device. In some examples, the encoded traffic conditions having the traffic condition and parametrization value stored therein are received by user computing device 102, and the traffic condition and/or parameterization value are stored in the channels of a coding uniform by the user computing device 102 during the process of unpacking the encoded traffic conditions.

At operation 514, the traffic condition within the coding uniform is accessed. In some instances, the user computing device 102 may utilize vertex information associated with the portion of road (e.g., a vertex buffer object) to identify the location of the quantized traffic condition within the coding uniform. For example, the vertex information may identify the coding uniform and/or the channel within the coding uniform in which the quantized traffic information is stored.

At operation 516, a corresponding color for the traffic condition is determined. In some instances, the user computing device 102 can determine the corresponding color for the quantized traffic condition based upon a lookup table. The lookup table can be an index table that identifies colors that correspond to various quantized traffic conditions (e.g., a quantized traffic condition of 0 or "normal" corresponds to green). The lookup table may be transmitted with the color space in operation 510, hardcoded into the user computing device, included within an application stored on the memory, etc. For example, the user computing device 102 can access the lookup table to determine the color of the representation that is to be drawn on the digital map. For example, where the quantized traffic condition stored in the color space is the value "1," the lookup table may indicate that the corresponding color is yellow.

At operation 518, the parameterization value within the color space is accessed. In some instances, the user computing device 102 may utilize vertex information associated with the portion of road (e.g., a vertex buffer object) to identify the location of the parameterization value within the color space. For example, the vertex information may identify the color space uniform and/or the color channel within the color space uniform in which the parameterization value is stored.

At operation 520, the corresponding color is rendered on the digital map in association with the portion of road. In some instances, the user computing device 102 may access geometric map information associated with the portion of road. For example, the user computing device 102 may access vertex information that identifies a location within a digital map at which the representation is to be drawn, etc. The user computing device 102 can then utilize the vertex information, the parametrization value, and the corresponding color to render a traffic representation on the digital map. For example, the user computing device 102 can render a traffic representation having the corresponding color, and the length indicated by the parametrization value, at a location on the digital map indicated by the vertex information.

Figure 6:
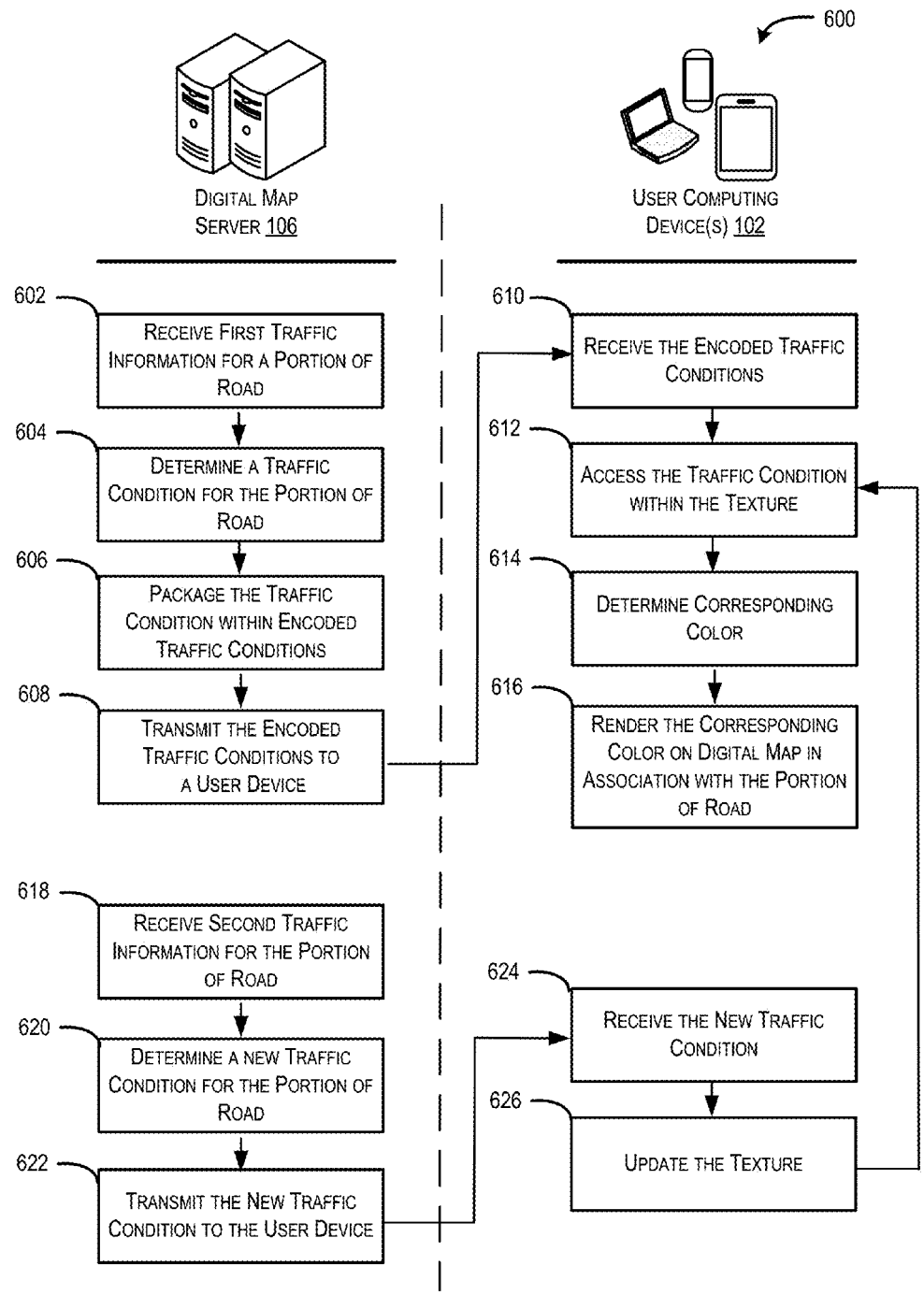
FIG. 6 is a flowchart illustrating another example process for efficiently transmitting traffic information within texture files that enables computing devices to render digital maps that convey current traffic conditions.

FIG. 6 illustrates a flowchart of another example process 600 for efficiently transmitting traffic information within texture files that enables computing devices to render digital maps that convey current traffic conditions. One or more operations of process 600 may be performed by a digital map server, as a local process by a computing device (e.g., user computing device 102), as a local process by an additional computing device (e.g., user computing device 110), or by a combination thereof. For ease of illustration, the operations of the process 600 will be described as being performed by digital map server 106 and user computing device 102.

As shown in FIG. 6, at operation 602, first traffic information for a portion of road is received. For example, the digital map server 106 can receive first traffic information for the portion of road from one or more traffic information sources such as GPS satellites, speed detectors, sensors, road cameras, websites, navigation applications, etc. The first traffic information can include data that relates to weather conditions, construction zones, road maintenance, road congestion, traffic message channel (TMC) codes, traffic speeds, accidents, road hazards, etc. For example, a traffic information source may transmit traffic information to the digital map server 106 that indicates the speeds and/or direction that cars on the portion of road are traveling.

At operation 604, a traffic condition for the portion of road is determined. In some examples, the traffic condition for the portion of road is determined by the digital map server 106 based in part on the first traffic information for the portion of road. In some instances, the digital map server 106 can utilize one or more rules, algorithms, averages, smart heuristics, etc. to determine the traffic condition for the portion of road.

At operation 606, the traffic condition for the portion of road is packaged within encoded traffic conditions. In some examples, the digital map server 106 may quantize the traffic condition (i.e., assign a value, a color, speed index, etc. for the portion of road), and package the quantized traffic condition as encoded traffic conditions. In some instances, the encoded traffic conditions may include the quantized traffic condition packaged within an array of a texture file in uniform of a coding language such as C++, OpenGL, Direct3D, Java, etc. In some instances, the digital map server 106 can package the quantized traffic condition within a color channel of color space (e.g., RGB, RGBA, etc.), and then package the color space within a texture file. For example, the digital map server may quantize the traffic condition "slow" determined in operation 604 as the value "1," and store the value "1" within the R color channel of an RGBA color space uniform.

At operation 608, encoded traffic conditions containing the traffic conditions are transmitted to a user computing device. In some examples, the digital map server 106 may transmit the encoded traffic conditions to user computing device 102 over network 108. The encoded traffic conditions may include quantized traffic conditions stored as arrays within a texture. Additional quantized traffic conditions and/or color spaces having traffic conditions stored in its color spaces may also be stored as arrays within the texture. In this way, a two dimensional texture having 2048 arrays per dimension is capable of storing index values for over 4 million different quantized traffic conditions (i.e., one traffic condition per array in the texture file).

At operation 610, the encoded traffic conditions containing traffic conditions are received. In some examples, the encoded traffic conditions containing the traffic conditions stored therein are received by user computing device 102, and the traffic conditions are stored in an array of a texture by the user computing device 102 during the process of unpacking the encoded traffic conditions.

At operation 612, the traffic condition within the texture is accessed. In some instances, the user computing device 102 may utilize vertex information associated with the portion of road (e.g., a vertex buffer object) to identify the location of the traffic condition within the texture. For example, the vertex information may identify the array in which the traffic condition is stored within the texture.

At operation 614, a corresponding color for the traffic condition is determined. In some instances, the user computing device 102 can determine the corresponding color for the quantized traffic condition based upon a lookup table. The lookup table can be an index table that identifies colors that correspond to various quantized traffic conditions (e.g., a quantized traffic condition of 0 or "normal" corresponds to green). The lookup table may be transmitted with the texture in operation 608, hardcoded into the user computing device, included within an application stored on the memory, etc. For example, the user computing device 102 can access the lookup table to determine the color of the representation that is to be drawn on the digital map.

At operation 616, the corresponding color is rendered on the digital map in association with the portion of road. In some instances, the user computing device 102 may access geometric map information associated with the portion of road. For example, the user computing device 102 may access vertex information that identifies a location within a digital map at which the representation is to be drawn, the length of the representation to be drawn (i.e., a parametrization value), etc. The user computing device 102 can then utilize the vertex information and the corresponding color to render a traffic representation on the digital map. For example, the user computing device 102 can render a traffic representation having the corresponding color, the length indicated by an associated parametrization value, at a location on the digital map indicated by the vertex information.

As shown in FIG. 6, at operation 618, second traffic information for a portion of road is received. For example, the digital map server 106 can receive the second traffic information for the portion of road from one or more traffic information sources such as GPS satellites, speed detectors, sensors, road cameras, websites, navigation applications, etc. The second traffic information can include data that relates to weather conditions, construction zones, road maintenance, road congestion, traffic message channel (TMC) codes, traffic speeds, accidents, road hazards, etc.

At operation 620, a new traffic condition for the portion of road is determined. In some examples, the new traffic condition for the portion of road is determined by the digital map server 106 based in part on the second traffic information for the portion of road. In some instances, the digital map server 106 can utilize one or more rules, algorithms, averages, smart heuristics, etc. to determine the new traffic condition for the portion of road.

At operation 622, the new traffic condition is transmitted to a user computing device. In some examples, the digital map server 106 may quantize the new traffic condition and transmit the quantized new traffic condition to user computing device 102 over network 108. Alternatively, the digital map server may quantize the new traffic condition, and package the quantized new traffic condition within a uniform of a coding language such as C++, OpenGL, Direct3D, Java, etc. In some instances, the digital map server 106 can package the quantized new traffic condition within a channel of a coding uniform (e.g., RGB, RGBA, etc.). The color space may also have additional traffic conditions associated with other portions of roads stored within its color channels.

At operation 624, the new traffic condition is received by the user computing device. In some examples, the new traffic condition is received by user computing device 102.

At operation 626, the texture is updated. In some examples, the user computing device 102 updates the texture so that the traffic condition is replaced with the new traffic condition. The process then proceeds to step 612.

The processes 400, 500, and 600 may be performed within the architecture of FIG. 1. However, the processes 400, 500, and 600 are not limited to being performed using the architecture 100. Moreover, the architecture 100 is not limited to performing the processes 400, 500, and 600.

The processes 400, 500, and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the processes 400, 500, and 600 may be combined in whole or in part.

The various techniques described herein may be implemented in the context of computer-executable instructions or software, such as program modules, that are stored in computer-readable storage and executed by the one or more processing unit(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined herein for purposes of discussion, the various functions and responsibilities might be distributed and divided in different ways, depending on circumstances.

Similarly, software may be stored and distributed in various ways and using different means, and the particular software storage and execution configurations described herein may be varied in many different ways. Thus, software implementing the techniques described herein may be distributed on various types of computer-readable media, not limited to the forms of memory that are specifically described.

Although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device comprising:
one or more processing units; and
memory configured to be in communication with the one or more processing units, the memory storing instructions that in accordance with execution by the one or more processing units, cause the one or more processing units to:

receive encoded traffic conditions for at least a portion of a road, the encoded traffic conditions comprising a first traffic condition for a first section of the portion of the road and a second traffic condition for a second section of the portion of the road;

package, for access by a graphics processing unit (GPU), the first traffic condition in a first array of a texture data file;

package, for access by the GPU, the second traffic condition in a second array of the texture data file;

process, by the GPU, the first traffic condition and the second traffic condition within the texture data file;

determine a first color corresponding to the first traffic condition based at least in part on a color lookup table;

determine a second color corresponding to the second traffic condition based at least in part on the color lookup table; and render a digital map based at least in part on geometric map information, the digital map including visual representations of current traffic conditions that include:
 a first traffic representation for the first section of the portion of the road having the first color, and
 a second traffic representation for the second section of the portion of the road having the second color.

2. The computing device of claim 1, wherein the first traffic condition is stored in the first array of the texture data file as a first two bit index value and the second traffic condition is stored in the second array of the texture data file as a second two bit index value.

3. The computing device of claim 1, wherein the instructions further cause the one or more processing units to access the geometric map information, wherein the geometric map information includes one or more vertex locations corresponding to the portion of the road and an index value that identifies the first array of the texture data file in which the first traffic condition is stored.

4. The computing device of claim 3, wherein the geometric map information further includes a parameterization value indicating a length of the first section of the portion of the road.

5. The computing device of claim 1, wherein the encoded traffic conditions are first encoded traffic conditions, and the instructions further cause the at least one or more processing units to:
 receive second encoded traffic conditions for at least the portion of the road, the second encoded traffic conditions comprising a third traffic condition for the first section of the portion of the road; and
 access the texture data file and replace the first traffic condition with the third traffic condition.

6. A computing device comprising:
 at least one processing unit; and
 memory configured to be in communication with the at least one processing unit, the memory storing instructions that based on execution by the at least one processing unit, cause the at least one processing unit to:
 receive encoded traffic conditions that comprise at least a traffic condition and a parameterization value associated with a portion of a road;
 store the traffic condition in a first channel of a coding uniform;
 store the parameterization value in a second channel of the coding uniform;
 determine a corresponding color associated with the traffic condition based at least in part on a color lookup table;
 determine a corresponding length associated with the portion of the road based at least in part on the parameterization value; and
 render a digital map based at least in part on geometric map information, the digital map including visual representations of current traffic conditions that includes a traffic representation associated with the portion of the road having the corresponding color and the corresponding length.

7. The computing device of claim 6, wherein the geometric map information includes one or more vertex locations corresponding to the portion of the road.

8. The computing device of claim 7, wherein the geometric map information comprises a vertex buffer object.

9. The computing device of claim 7, wherein the geometric map information comprises geometries of one or more of roads, rivers, bridges, buildings, parks, or objects associated with the digital map.

10. The computing device of claim 6, wherein the traffic condition associated with the portion of the road is a first traffic condition associated with a first portion of the road, the parameterization value associated with the portion of the road is a first parameterization value associated with the first portion of the road, wherein the encoded traffic conditions further comprise a second traffic condition and a second parametrization value associated with a second portion of road, and the instructions further cause the at least one processing unit to:
 store the second traffic condition within a third channel of the coding uniform; and
 store the second parameterization value within a fourth channel of the coding uniform.

11. The computing device of claim 10, wherein the corresponding color is a first corresponding color, the corresponding length is a first corresponding length, the traffic representation is a first traffic representation, and the instructions further cause the at least one processing unit to:
 determine a second corresponding color associated with the second traffic condition based at least in part on the color lookup table;
 determine a second corresponding length associated with the second portion of the road based at least in part on the second parameterization value; and
 wherein the visual representations of current traffic conditions further include a second traffic representation associated with the second portion of the road having the second corresponding color and the second corresponding length.

12. The computing device of claim 11, wherein rendering the digital map comprises drawing the first traffic representation from a vertex location included in the geometric map information, and drawing the second traffic representation from an endpoint of the first traffic representation.

13. The computing device of claim 6, wherein the encoded traffic conditions are first encoded traffic conditions, the traffic condition associated with the portion of road is a first traffic condition associated with a first portion of road, the coding uniform is a first coding uniform, the corresponding color is a first corresponding color, the visual representations of current traffic conditions are first visual representations of traffic conditions, the traffic representation is a first traffic representation, and the instructions further cause the at least one processing unit to:
 receive second encoded traffic conditions that comprise at least a second traffic condition associated with the first portion of the road;

store the second traffic condition in a third channel of a second coding uniform;
determine a second corresponding color associated with the second traffic condition based at least in part on the color lookup table; and
render the digital map based at least in part on the geometric map information, the digital map including a second visual representations of current traffic conditions that includes a second traffic representation associated with the portion of road having the second corresponding color.

14. A method comprising:
receiving encoded traffic conditions that comprise at least a first traffic condition associated with a first portion of a road and a second traffic condition associated with a second portion of the road;
packaging, for access by a graphics processing unit (GPU), the first traffic condition in at least one of a first channel of a coding uniform or a first array of a texture data file;
packaging, for access by the GPU, the second traffic condition in at least one of a second channel of the coding uniform or a second array of the texture data file;
determining, by the GPU, a first color corresponding to the first traffic condition based at least in part on a color lookup table;
determining, by the GPU, a second color corresponding to the second traffic condition based at least in part on the color lookup table; and
rendering a digital map based at least in part on geometric map information, the digital map including visual representations of current traffic conditions that include:
a first traffic representation associated with the first portion of the road having the first color, and
a second traffic representation associated with the second portion of the road having the second color.

15. The method of claim 14, wherein storing the first traffic condition comprises storing the first traffic condition in the first array of the texture data file the first traffic condition comprises a first two bit index value, and the second traffic condition comprises a second two bit index value.

16. The method of claim 14, wherein the geometric map information includes one or more vertex locations corresponding to the first portion of the road and a length associated with the first portion of the road.

17. The method of claim 14, wherein packaging the first traffic condition comprises storing the first traffic condition in the first channel of the coding uniform, wherein packaging the second traffic condition comprises storing the second traffic condition in the second channel of the coding uniform, wherein the encoded traffic conditions further comprises a first parametrization value associated with the first traffic condition and a second parametrization value associated with the second traffic condition, and the method further comprising:
storing the first parameterization value within a third channel of the coding uniform; and
storing the second parameterization value within a fourth channel of the coding uniform.

18. The method of claim 17, wherein rendering the digital map further includes:
drawing, based at least in part on the first parameterization value, the first traffic representation as having a first length; and
drawing, based at least in part on the second parameterization value, the second traffic representation as having a second length.

19. The method of claim 14, wherein packaging the first traffic condition comprises storing the first traffic condition in the first array of the texture data file, packaging the second traffic condition comprises storing the second traffic condition in the second array of the texture, and the method further comprises:
accessing the geometric map information, the geometric map information including one or more vertex locations corresponding to the first portion of the road, a length associated with the first portion of the road, and an index value that identifies the first array of the texture data file where the first traffic condition is stored.

20. The method of claim 19, wherein the encoded traffic conditions are first encoded traffic conditions, and the method further comprising:
receiving second encoded traffic conditions comprising a third traffic condition for the first portion of the road; and
accessing the texture data fl and replacing the first traffic condition with the third traffic condition.

* * * * *